US006824314B2

United States Patent
Bendelli et al.

(10) Patent No.: US 6,824,314 B2
(45) Date of Patent: Nov. 30, 2004

(54) PACKAGE FOR OPTO-ELECTRICAL COMPONENTS

(75) Inventors: Giampaolo Bendelli, Almese (IT); Enrico Di Mascio, Sulmona (IT); Piero Gambini, Turin (IT); Mario Puleo, Borgosesia (IT); Marco Scofet, Rivarolo C.se (IT); Ian Smith, Woodbridge (GB)

(73) Assignee: Agilent Technologies, Inc., Palo Alto, CA (US)

( * ) Notice: Subject to any disclaimer, the term of this patent is extended or adjusted under 35 U.S.C. 154(b) by 131 days.

(21) Appl. No.: 10/256,065

(22) Filed: Sep. 27, 2002

(65) Prior Publication Data

US 2003/0059175 A1 Mar. 27, 2003

(30) Foreign Application Priority Data

Sep. 27, 2001 (EP) ............................................. 01308228

(51) Int. Cl.[7] .............................................. G02B 6/36
(52) U.S. Cl. .............................. 385/92; 385/94; 385/88
(58) Field of Search ...................................... 385/88–94

(56) References Cited

U.S. PATENT DOCUMENTS

| 5,689,600 | A | | 11/1997 | Griffin .......................... 385/88 |
| 5,708,743 | A | | 1/1998 | DeAndrea et al. ............ 385/88 |
| 6,220,765 | B1 | | 4/2001 | Tatoh ........................... 385/94 |
| 6,659,659 | B1 | * | 12/2003 | Malone ........................ 385/94 |
| 2003/0123819 | A1 | * | 7/2003 | Nakanishi et al. ............ 385/92 |
| 2004/0033031 | A1 | * | 2/2004 | Zaborsky et al. ............. 385/89 |

FOREIGN PATENT DOCUMENTS

| EP | 0 398 597 | 11/1990 | ........... H01L/25/16 |
| WO | 87/02833 | 5/1987 | ............ G02B/6/42 |

* cited by examiner

Primary Examiner—Akm Enayet Ullah
Assistant Examiner—Kevin S. Wood

(57) ABSTRACT

A package for opto-electrical components, includes a casing having (1) a chamber and (2) at least one board or tile for carrying the opto-electrical components. The casing has an opening (shaped as a parallelogram) defining an optical feed-through path between the chamber and the outside of the casing. The casing includes ceramic material in the vicinity of the opening. An adapter associated with the opening has a substantially circular aperture to accept a fiber pigtail and/or a fiber optic connector.

7 Claims, 3 Drawing Sheets

# PACKAGE FOR OPTO-ELECTRICAL COMPONENTS

FIELD OF INVENTION

The present invention relates to packages for opto-electrical components, the term "opto-electrical components" being used herein to designate in general those circuits, assemblies or sub-assemblies comprising electrical, optical as well as optoelectronic (e.g., photodetectors, laser sources, etc.) devices. Exemplary of such packages are transmitter/receiver packages for optical transmission systems.

BACKGROUND ART

Such packages must in general comply with a number of requirements which are at least partly conflicting among them. For instance, the package structure should provide all the external constant electrical connections both at radio frequency (RF) and DC, and optical feed-through, as well as mechanical protection. Flexibility in the internal layout is also an extensively felt need, in that such a layout should be preferably chosen depending on the configuration of components to be included in the device. Electrical connections should be ensured with a high degree of reliability, the same also applying to the mechanical structure of the package. Finally, assembling the package should be easy, leaving a reasonable degree of freedom of movement.

Such requirements do not appear to be satisfactorily met by prior art package solutions which generally are provided for a fixed design.

This applies particularly to providing the so-called optical feed-through when ceramic materials are used for the structure of the casing of the package.

In fact, when package frames of a metal material are used (as shown e.g. in U.S. Pat. No. 6,220,765), the optical feed-through is simply provided by an aperture or hole in one of the metal walls of the package.

Conversely, when ceramic materials, such as alumina, are used for the package and, more to the point, when layered ceramic material technology is used for the package, a limitation may arise in respect of the size, shape and location of the optical feed-through.

The object of the present invention is thus to provide an improved solution overcoming the disadvantage outlined in the foregoing.

SUMMARY OF THE INVENTION

According to the present invention, a package for opto-electrical components comprises a casing including a housing chamber for the opto-electrical components, wherein the casing has an opening that defines an optical feed-through path between the chamber and the casing exterior. The casing includes a ceramic material at least in the vicinity of the opening. An adapter associated with the opening has an aperture for accepting at least one of a fiber pigtail or a fiber optic connector. Preferably, the opening has a parallelogram shape and the aperture is substantially circular.

The adapter preferably includes metal material and is brazed to the casing. The adapter preferably includes at least one portion adaptively fitting into the parallelogram-shaped opening.

At least one board or tile adapted to be housed in the chamber of the casing carries the components. A photodetector and a first amplifier stage associated with the photodetector are preferably mounted on the silicon optical bench that is carried by the at least one board or tile.

The optical bench is preferably provided with electrical tracks at its underside. The casing preferably includes a ceramic base member having via-holes.

A transimpedance amplifier and a post amplifier are preferably carried by the board or tile. The transimpedance amplifier and post amplifier are connected by a capacitor that is connected via direct bonding to at least one of the transimpedance amplifier and the post amplifier. The at least one bonding is preferably associated with the components and covered with an impedance-matching glue.

At least one board or tile adapted to be housed in the chamber of the casing carries said components which are attached by glueing to at least one board or tile.

The above and still further objects, features and advantages of the present invention will become apparent upon consideration of the following detailed descriptions of one specific embodiment thereof, especially when taken in conjunction with the accompanying drawings.

DETAILED DESCRIPTION OF THE DRAWING

Figure 1:
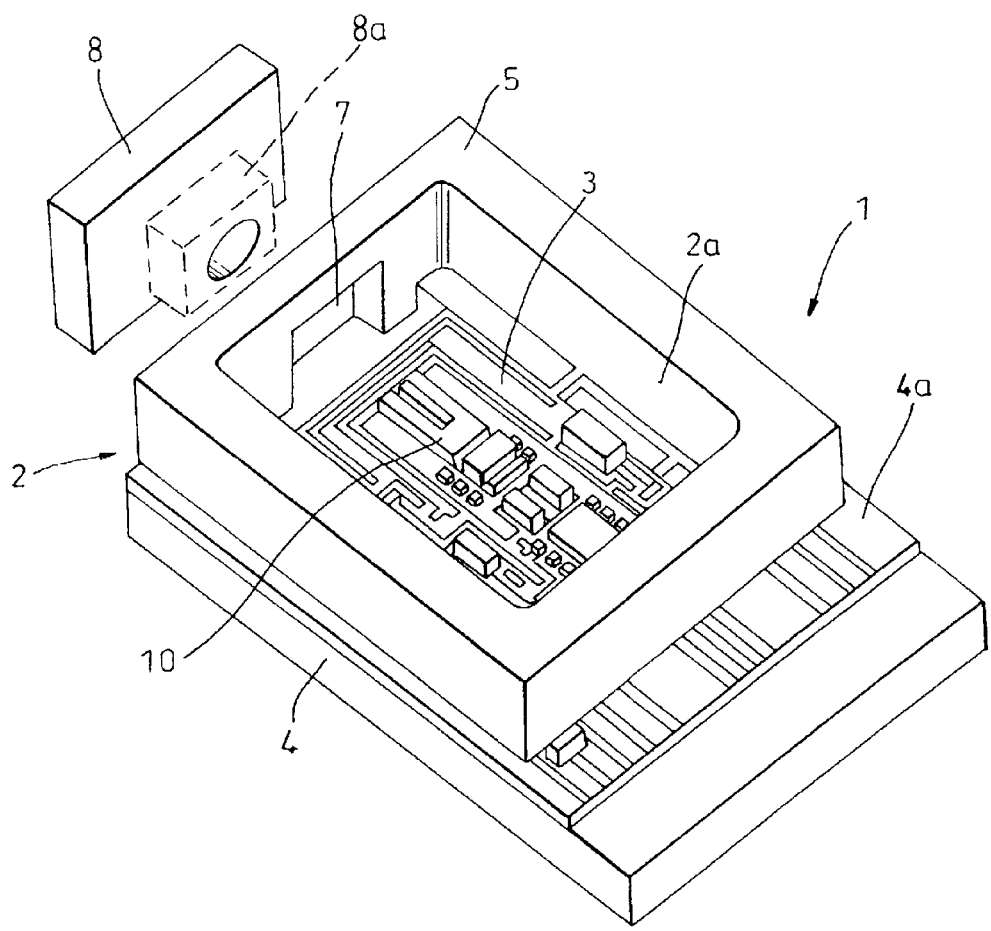
FIG. 1 is a first perspective view of a preferred embodiment of a package according to the invention.

In the drawings, package 1 includes opto-electrical components that are typically parts of an optical receiver used in high bit-rate optical transmission systems.

Package 1 essentially includes two parts or portions, namely:

(1) a basic structure or casing 2 having preferably an overall vat-like or dish-shaped configuration thus defining a housing chamber 2a therein, and (2) a microboard or "tile" 3 essentially comprised of a card-like member (preferably having the typical structure of a current printed circuit or hybrid circuit board) adapted to be housed in chamber 2a.

The arrangement of package 1 preferably allows different microboards or tiles 3 selected from a wide—virtually infinite—gamut to be assembled into a single type of casing 2 following different needs/operations or requirements.

Still preferably, casing 2 is comprised of a flat base member 4 constituting a sort of a socket having one end 4a protruding from the remaining portion of casing 2. This latter portion is essentially comprised of a sort of box-like member 5 extending upwardly from base member 4.

Box-like member 5 (whose internal cavity constitutes chamber 2a) is substantially rectangular in shape. Other shapes (round, oval, etc.) can obviously be chosen. However, a rectangular shape is held to better fit the shape of microboards or tiles 3, which are usually rectangular.

End 4a of base member 4 carries, on at least one of its surfaces, electrically conductive parts or strips 6a, 6b, 6c, which provide constant electrical ohmic connections (RF+DC) between the component receiving volume in chamber 2a intended to house microboards 3 and the outside of package 1.

Preferably, contacts 6a, 6b, 6c are strip members for enabling ohmic connection of package 1 to a flat ribbon connector (not shown).

All of casing 2 (namely base member 4 and box-like member 5) is preferably made of ceramic material, such as alumina. Manufacturing package 1 using said materials involves technologies which are well known in the art and do not require to be described in detail here.

Use of such an all-alumina package is particularly advantageous for operating ranges of 10 Gbit/s and higher. However, especially when layered ceramic material technology is used, significant limitations can be encountered in providing the wall of casing 2 with at least one opening 7 (see FIG. 1) defining a so-called optical feed-through path, i.e. a port for connecting one or more optical fibers to the components (to be described later in greater detail) located within package 1. Preferably, optical feed-through port 7 is located opposite to end 4a carrying electrical connection strips 6a, 6b, 6c.

Figure 3:
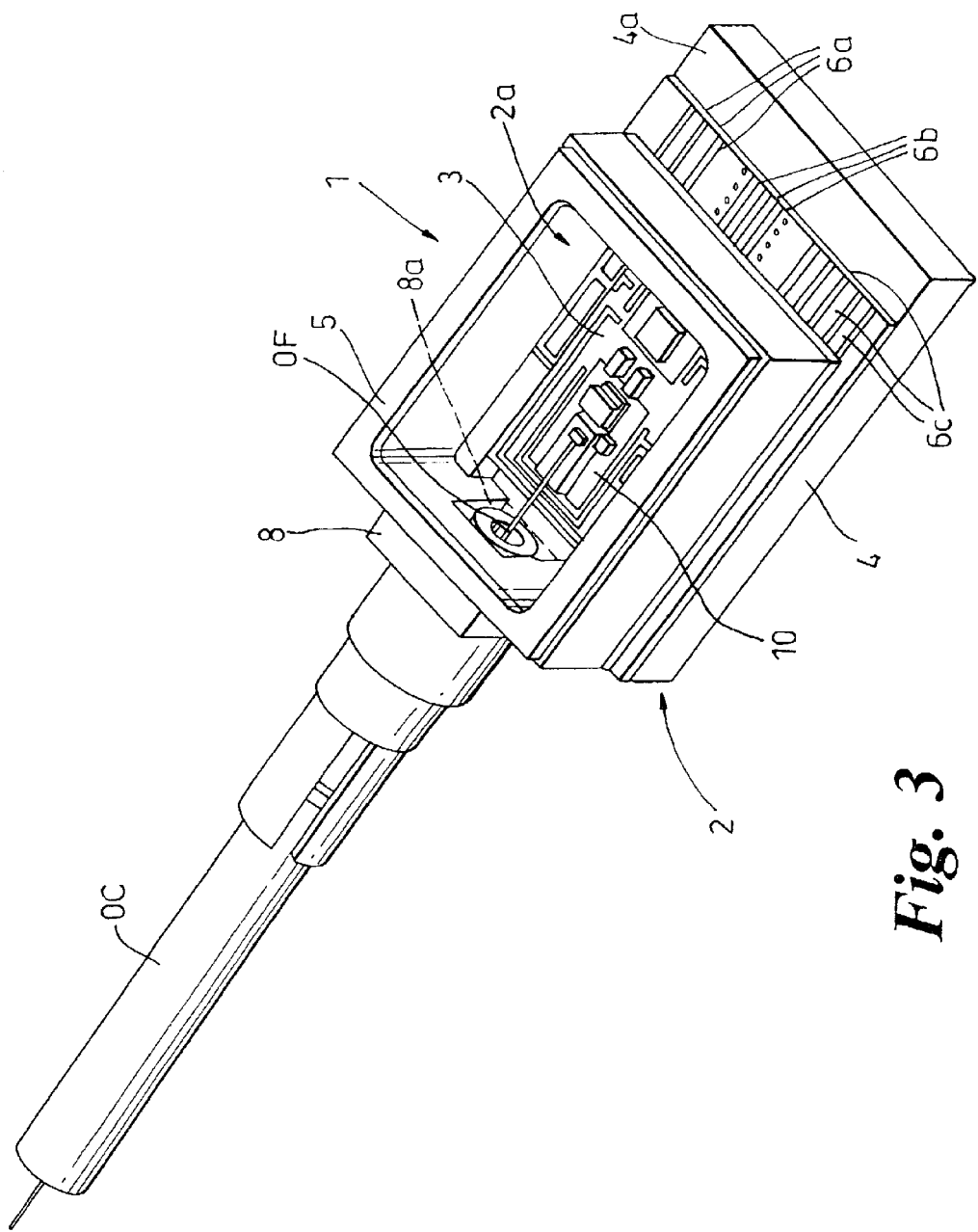
FIG. 3 is still another perspective view of the package of FIG. 1 connected to an optical cable.

Due to the intrinsic limitations of ceramic material technology, such a port 7 can essentially be provided in the form of an opening of a square/rectangular (i.e. parallelogram) shape, which is not particularly well suited for expected connection to package 1 of an optical cable OC as shown in FIG. 3. These cables are usually formed as elongated cylindrical structures terminated by a connector having a main central axis defined by an optical fiber OF located therein.

Associated with opening 7 is an adapter 8 comprised of a metal body. A presently preferred choice for the metal of adapter 8 is an iron-nickel-cobalt alloy commercially available under the designation of KOVAR™.

Figure 2:
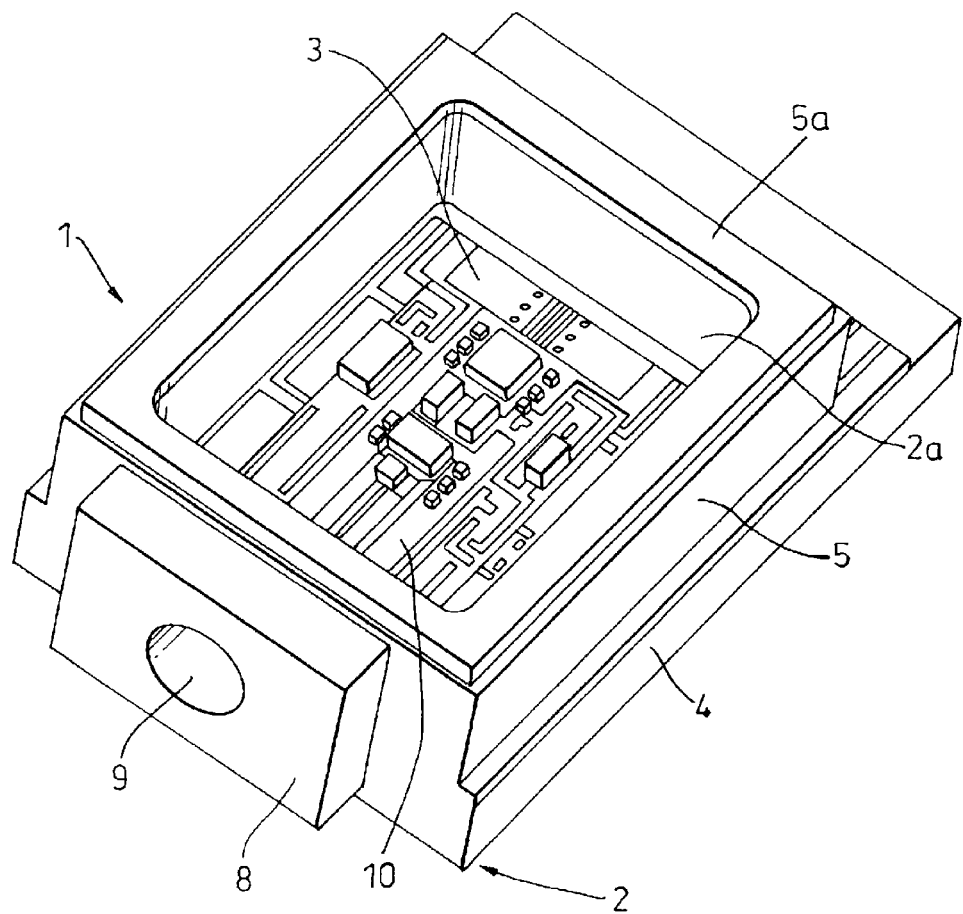
FIG. 2 is another perspective view of the package.

KOVAR™ is a material having the following three requirements:

(1) enable adapter 8 to be shaped to include an extension 8a (shown in phantom lines in FIGS. 1 and 3) to be inserted, in a fluid/gas tight manner, within opening 7, (2) enable adapter 8 to be secured and tightly retained (e.g. by brazing) to the ceramic material comprising casing 2, and (3) enable adapter 8 to be easily shaped to include an aperture formed as a round through hole 9 (see especially FIG. 2) adapted to accept, depending on the specific requirements, a simple fiber pigtail or a fiber optic connector receptacle, as is the case of connection with optical cable OC shown in FIG. 3.

Preferably, package 1 houses a silicon optical bench (SiOB) 10 holding both a photodetector (typically a PIN diode) as well as a transimpedance amplifier (TIA) associated therewith. In that way, silicon microbench 10 holds both fiber OF (FIG. 3) and the photodetector allowing an easy alignment.

Locating the transimpedance amplifier on bench 10 allows the distance between the photodetector and the amplifier to be controlled with high precision. The possibility of precisely controlling the length of electrical connections between the photodetector and the first amplifier stage associated therewith is particularly significant in high bit-rate applications.

Preferably, silicon bench 10 includes electrical tracks located at the underside thereof. This overcomes the intrinsic difficulty of designing the layout of electrical tracks in a small package, unless complicated and expensive via-holes and multiple layer boards are employed.

In the specific case, the silicon material of the silicon bench 10 is passivated whereby it acts as an insulator which enables electrical tracks to be at the side of the bench facing the bottom wall of chamber 2a.

Direct bonding is preferably used to connect a DC blocking, AC coupling capacitor to the transimpedance amplifier and the post amplifier. Direct bonding simplifies connections and improves radio-frequency performance of the electrical circuitry, the connection between the transimpedance amplifier and one end of the DC-blocking capacitor, thus dispensing with the need of using for that purpose a radio-frequency track on the package internal board.

The same concept applies to the connection between the DC-blocking capacitor and the post amplifier.

Glue is preferably used in place of metal soldering for locating and fixing components.

Via-holes (not shown) are provided to allow e.g. BGA (Ball Grid Array) or PIN connection. Via-holes can be easily provided in the bottom wall of base portion 4 of package 1 that is formed of an insulating ceramic material. Brazed leads can be used as an alternative to BGA for connecting the package to a printed circuit board.

Still preferably, the bondings are covered with an impedance-matching glue to improve electrical transmission and maintain an almost constant impedance inside or outside the receiver package.

The top of the package 1 is preferably closed by a conductive lid (not shown) comprised e.g. of KOVAR™ that is glued or soldered to a metallic ring layer 5a which is in turn brazed on the upper rim of box-like portion 5 of casing 2.

Of course, the basic principle of the invention remaining the same, the details and embodiments may vary with respect to the exemplary embodiment shown and described herein without departing from the scope of the invention, as defined by the annexed claims.

This applies particularly, but not exclusively, to the possibility e.g. of including in the structure of casing 1 one or more layers, such as a bottom layer, of a metal material to permit connection to ground and/or the possibility of mounting package 1 on an intermediate frame, possibly of flexible material (e.g. by means of screws).

What is claimed is:

1. A package for opto-electrical components, comprising a casing including a chamber for said opto-electrical components, said casing having an opening defining an optical feed-through path between said chamber and the exterior of said casing, said casing including a ceramic material at least in the vicinity of said opening, an adapter associated with said opening, said adapter having a substantially circular aperture for accepting at least one of a fiber pigtail or a fiber optic connector; wherein said adapter includes metal material;

is brazed to said casing;

includes at least one portion adaptively fitting into said opening; the package further including:

at least one board or tile for carrying said components, said board or tile being adapted to be housed in said chamber of said casing, a silicon optical bench carried by said at least one board or tile, and a photodetector and a first amplifier stage associated with said photodetector, both the photodetector and said first amplifier being mounted on said silicon optical bench.

2. The package of claim 1, wherein said optical bench includes electrical tracks at its underside.

3. The package of claim 2, wherein said casing includes a ceramic base member having via-holes.

4. The package of claim 3, further including at least one board or tile for carrying said components, said board or tile being adapted to be housed in said chamber of said basic structure, and a transimpedance amplifier and a post amplifier carried by said board or tile, said transimpedance amplifier and said post amplifier being connected through a capacitor, said capacitor being connected via direct bonding to at least one of said transimpedance amplifier and said post amplifier.

5. The package of claim 4, wherein at least one bonding is associated with said components, said at least one bonding being covered with an impedance-matching glue.

6. A package for opto-electrical components, comprising a casing including a chamber for said opto-electrical components, said casing having an opening defining an optical feed-through path between said chamber and the exterior of said casing, said casing including a ceramic material at least in the vicinity of said opening, an adapter associated with said opening, said adapter having a substantially circular aperture for accepting at least one of a fiber pigtail or a fiber optic connector, further including: at least one board or tile for carrying said components, said board or tile being adapted to be housed in said chamber of said casing, a silicon optical bench carried by said at least one board or tile, and a photodetector and a first amplifier stage associated with said photodetector, both the photodetector and said first amplifier being mounted on said silicon optical bench.

7. A package for opto-electrical components, comprising a casing including a chamber for said opto-electrical components said casing having an opening defining an optical feed-through path between said chamber and the exterior of said casing, said casing including a ceramic material at least in the vicinity of said opening, an adapter associated with said opening, said adapter having a substantially circular aperture for accepting at least one of a fiber pigtail or a fiber optic connector, further including a transimpedance amplifier and a post amplifier carried by said board or tile, said transimpedance amplifier and said post amplifier being connected through a capacitor, said capacitor being connected via direct bonding to at least one of said transimpedance amplifier and said post amplifier.

* * * * *